United States Patent
Ogawa et al.

(10) Patent No.: US 12,515,325 B2
(45) Date of Patent: Jan. 6, 2026

(54) DRIVE SYSTEM, CONTROL METHOD, AND CONTROL PROGRAM

(71) Applicant: OMRON Corporation, Kyoto (JP)

(72) Inventors: Atsushi Ogawa, Kyoto (JP); Yukio Iname, Kyoto (JP); Teja Emmey, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 189 days.

(21) Appl. No.: 18/270,265

(22) PCT Filed: Mar. 9, 2021

(86) PCT No.: PCT/JP2021/009172
§ 371 (c)(1),
(2) Date: Jun. 29, 2023

(87) PCT Pub. No.: WO2022/153560
PCT Pub. Date: Jul. 21, 2022

(65) Prior Publication Data
US 2024/0058958 A1 Feb. 22, 2024

(30) Foreign Application Priority Data
Jan. 15, 2021 (JP) ................................. 2021-004649

(51) Int. Cl.
*B25J 9/16* (2006.01)
(52) U.S. Cl.
CPC .................................. *B25J 9/1633* (2013.01)

(58) Field of Classification Search
CPC ............. B25J 9/1633; H02P 6/04; H02P 6/08; H02P 6/34; H02P 25/06; H02P 2205/05;
(Continued)

(56) References Cited

U.S. PATENT DOCUMENTS

| 6,502,837 B1 | 1/2003 | Hamilton et al. |
| 2005/0280218 A1 | 12/2005 | Parison et al. |

(Continued)

FOREIGN PATENT DOCUMENTS

| JP | 2006-074987 A | 3/2006 |
| JP | 2006-125633 A | 5/2006 |

(Continued)

OTHER PUBLICATIONS

Extended European Search Report dated Nov. 12, 2024 in Application No. 21919453.7.
(Continued)

*Primary Examiner* — Dylan M Katz
(74) *Attorney, Agent, or Firm* — Sughrue Mion, PLLC

(57) ABSTRACT

A drive system includes an actuator that is driven by a motor to generate displacement, a driver that drives the motor, and a controller that gives a control instruction to the driver. The controller creates a physical model based on displacement caused by application of an external load to the actuator; generates a first control instruction to the motor such that the actuator generates the displacement according to the physical model; determines a spring constant; generates a second control instruction to the motor so as to generate drive force calculated based on a product of the spring constant and the displacement generated in the actuator; and selects and validates one of the first and second control instructions.

19 Claims, 17 Drawing Sheets

(58) Field of Classification Search
CPC ....... H02P 25/024; G05B 11/36; G05B 13/04; G05B 2219/39345; F16F 1/041; H02K 7/06

See application file for complete search history.

(56) References Cited

U.S. PATENT DOCUMENTS

| | | |
|---|---|---|
| 2006/0095180 A1 | 5/2006 | Ummethala et al. |
| 2006/0200287 A1 | 9/2006 | Parison et al. |
| 2007/0160592 A1 | 7/2007 | Chornenky et al. |
| 2010/0320357 A1 | 12/2010 | Ummethala et al. |
| 2011/0233364 A1 | 9/2011 | Breen et al. |
| 2013/0026963 A1 | 1/2013 | Sonoda et al. |
| 2013/0092814 A1 | 4/2013 | Breen et al. |
| 2013/0334394 A1 | 12/2013 | Parison, Jr. et al. |
| 2017/0112580 A1* | 4/2017 | Griffiths ............... F16M 13/022 |
| 2018/0157236 A1 | 6/2018 | Shinoda et al. |
| 2019/0366791 A1 | 12/2019 | Toyohira et al. |
| 2020/0130200 A1* | 4/2020 | Adachi ................. B25J 13/085 |
| 2020/0331316 A1 | 10/2020 | Ohno et al. |
| 2021/0013773 A1* | 1/2021 | Lee ..................... B25J 19/00 |
| 2021/0023904 A1 | 1/2021 | Kasuya et al. |
| 2022/0066404 A1 | 3/2022 | Namie et al. |

FOREIGN PATENT DOCUMENTS

| | | |
|---|---|---|
| JP | 2009-119904 A | 6/2009 |
| JP | 4296110 B2 | 7/2009 |
| JP | 2013-521443 A | 6/2013 |
| JP | 5845884 B2 | 1/2016 |
| JP | 2019-209781 A | 12/2019 |
| JP | 2020-126481 A | 8/2020 |
| JP | 2020-175729 A | 10/2020 |
| WO | 2019/187223 A1 | 10/2019 |

OTHER PUBLICATIONS

International Search Report for PCT/JP2021/009172 dated Jun. 1, 2021 (PCT/ISA/210).

Written Opinion for PCT/JP2021/009172 dated Jun. 1, 2021 (PCT/ISA/237).

* cited by examiner

DRIVE SYSTEM, CONTROL METHOD, AND CONTROL PROGRAM

CROSS REFERENCE TO RELATED APPLICATIONS

This application is a National Stage of International Application No. PCT/JP2021/009172 filed Mar. 9, 2021, claiming priority based on Japanese Patent Application No. 2021-004649 filed Jan. 15, 2021, the contents of each of which being herein incorporated by reference in their entireties.

TECHNICAL FIELD

The present invention relates to a drive system, a control method in the drive system, and a control program for controlling the drive system.

BACKGROUND ART

As a mechanism attenuating or controlling kinetic energy generated when an object comes into contact with an object, various configurations such as an elastic body such as a spring and rubber, a damper (for example, an oil damper), and an air cylinder have been proposed and put into practical use. In addition, there is also a configuration that adopts control using sensing results by various sensors.

In the mechanism using the spring or the rubber, performance of attenuating the kinetic energy is determined depending on a physical characteristic of the incorporated spring or rubber. The performance of the damper to attenuate the kinetic energy depends on a size, an orifice diameter, and the like. The performance of the air cylinder to attenuate the kinetic energy depends on the size, air pressure, and the like. These mechanical configurations have problems that force less than or equal to its own weight cannot be controlled, a design and a mechanism corresponding to a target are required, and position accuracy is low.

In addition, there is also a configuration in which an actuator (for example, a cylinder) driven by air, a motor, or the like is controlled based on a sensing result by a sensor. As such an electrical configuration, The following prior arts exist as such an electrical configuration.

For example, Japanese Patent Laying-Open No. 2006-074987 (PTL 1) discloses a typically linear controllable source of force along a path that actively absorbs or applies energy from a vehicle wheel support assembly moving over rough surfaces to facilitate considerably reducing force transmitted to the vehicle body supported on the wheel support assembly.

Japanese Patent Laying-Open No. 2006-125633 (PTL 2) discloses a method for actively suspending an actual facility in a vehicle. The disclosed method includes modifying a control signal based on a difference between a characteristic of the actual facility as indicated by a response of the actual equipment to the control signal and a characteristic of a reference facility.

Japanese National Patent Publication No. 2013-521443 (PTL 3) discloses an active vibration preventing device configured to control a position of a body with respect to a reference frame.

CITATION LIST

Patent Literatures

PTL 1: Japanese Patent Laying-Open No. 2006-074987
PTL 2: Japanese Patent Laying-Open No. 2006-125633
PTL 3: Japanese National Patent Publication No. 2013-521443

SUMMARY OF INVENTION

Technical Problem

In the electric actuator as described above, the configuration of control logic and the like may be complicated. For example, the control logic in consideration of the characteristic of the object in mechanical contact with the actuator is required to be configured, and it takes time and effort to tune when many parameters included in the control logic exist.

One object of the present invention is to provide a drive system including an actuator capable of easily performing the configuration of the control logic, simulation for facility design, and the like.

Solution to Problem

A drive system according to an example of the present invention includes an actuator that is driven by a motor to generate displacement, a driver that drives the motor, and a controller that gives a control instruction to the driver. The controller includes: a model creation unit that creates a physical model based on displacement caused by application of an external load to the actuator; a first instruction generating unit that generates a control instruction to the motor such that the actuator generates the displacement according to the physical model; a determination unit that determines a spring constant; a second instruction generating unit that generates a control instruction to the motor so as to generate drive force calculated based on a product of the spring constant and the displacement generated in the actuator; and a selecting unit that selects and validates one of the control instructions of the first instruction generating unit and the second instruction generating unit.

According to this configuration, a behavior appropriately receiving a load from the outside, and absorbing an excessive load generated when objects come into contact with each other, or preventing generation of a point load and a behavior generating a load according to an ideal spring behavior from an actuator cab be selectively executed.

The selecting unit may validate the control instruction from the second instruction generating unit when a predetermined switching condition is satisfied while the control instruction from the first instruction generating unit is validated. According to this configuration, the operation generating a predetermined load from the actuator can be implemented after the operation absorbing the load applied to the actuator is absorbed according to the control instruction from the first instruction generating unit.

The switching condition may be based on an elapsed time after the external load is applied to the actuator. According to this configuration, for example, in the case where a predetermined time has elapsed from the start of the operation of the actuator, control switching the behavior can be implemented.

The switching condition may be based on displacement generated in the actuator. According to this configuration, for example, when the actuator is contracted by a predetermined amount, control switching the behavior can be implemented.

The first instruction generating unit may output a position instruction designating a target position of the motor as the control instruction, and the second instruction generating unit may output a torque instruction for designating torque to be generated by the motor as the control instruction. According to this configuration, the first instruction generating unit controls the position of the actuator, so that ideal spring behavior can be implemented. The second instruction generating unit controls the torque to be generated by the motor, so that the load generated by the actuator can be controlled according to the ideal behavior of the spring.

The model creation unit may create the physical model when a predetermined load is applied to the actuator from the outside. According to this configuration, a behavior as a spring can be started when the predetermined load is applied from the outside while a stationary state is maintained until the predetermined load is applied from the outside.

The determination unit may set the spring constant for each control period. According to this configuration, the optimum spring constant in each control period can be set according to the purpose and situation.

According to another example of the present invention, a control method for an actuator that is driven by a motor to generate displacement is provided. The control method includes: creating a physical model based on displacement generated by application of an external load to the actuator; determining a spring constant; controlling the motor such that the actuator produces displacement according to the physical model; and switching control of the motor so as to generate drive force calculated based on a product of the spring constant and the displacement generated in the actuator when a predetermined switching condition is satisfied while the motor is controlled such that the actuator generates the displacement according to the physical model.

According to still another example of the present invention, a control program for controlling an actuator that is driven by a motor to generate displacement is provided. The control program causes a computer to perform: creating a physical model based on displacement generated by application of an external load to the actuator; determining a spring constant; controlling the motor such that the actuator produces displacement according to the physical model; and switching control of the motor so as to generate drive force calculated based on a product of the spring constant and the displacement generated in the actuator when a predetermined switching condition is satisfied while the motor is controlled such that the actuator generates the displacement according to the physical model.

Advantageous Effects of Invention

According to one aspect of the present invention, the drive system including the actuator capable of easily performing the creation of the control logic, the simulation for facility design, and the like can be implemented.

DESCRIPTION OF EMBODIMENT

Figure 1:
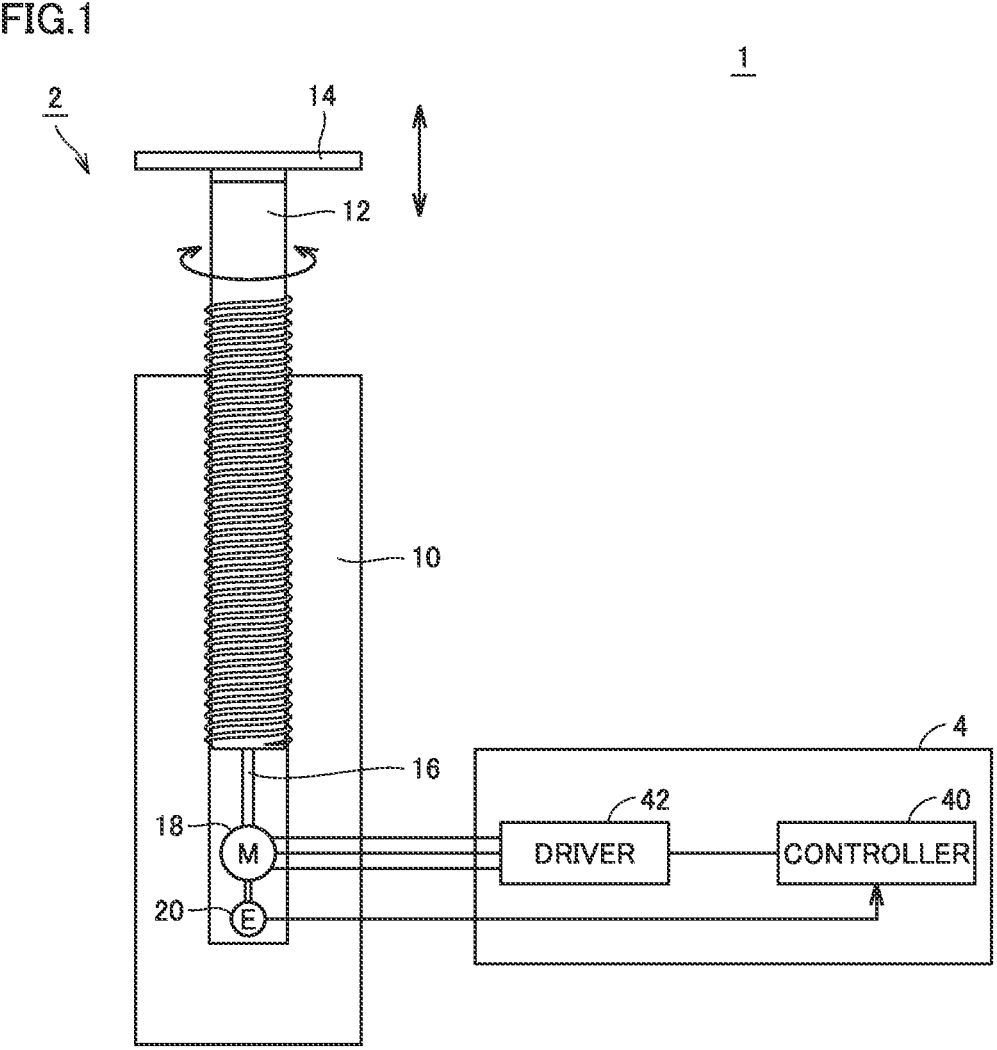
FIG. 1 is a schematic diagram illustrating a main part of a drive system according to an embodiment.

With reference to the drawings, an embodiment of the present invention will be described in detail. The same or equivalent part in the drawings is denoted by the same reference numeral, and the description will not be repeated.

A. Application Example

An example of a scene to which the present invention is applied will be described.

FIG. 1 is a schematic diagram illustrating a main part of a drive system 1 according to the embodiment. With reference to FIG. 1, drive system 1 includes an actuator 2 and a drive device 4.

Actuator 2 is driven by a motor 18 to generate displacement (in an example of FIG. 1, the displacement in a vertical direction on a paper surface). As actuator 2, any configuration driven by a motor may be adopted, and for example, a ball screw or a linear actuator can be used. In the following description, a case where the present invention is applied to actuator 2 mainly including the ball screw will be described as an example.

More specifically, actuator 2 includes a main body 10 including a space inside, a rod 12 that engages with a screw groove formed inside main body 10, a distal end portion 14 provided at a distal end of rod 12, a coupling member 16 that mechanically couples rod 12 and motor 18, and an encoder 20 that detects a rotation speed or a rotation angle of motor 18. Encoder 20 is mechanically connected to motor 18 and detects the displacement in actuator 2.

Drive device 4 includes a driver 42 that supplies power to motor 18 to drive motor 18 and a controller 40 that receives a detection signal from encoder 20 and gives a control instruction to driver 42.

Although FIG. 1 illustrates an example of drive system 1 including one actuator 2, a configuration including a plurality of actuators 2 can also be implemented.

Figure 2:
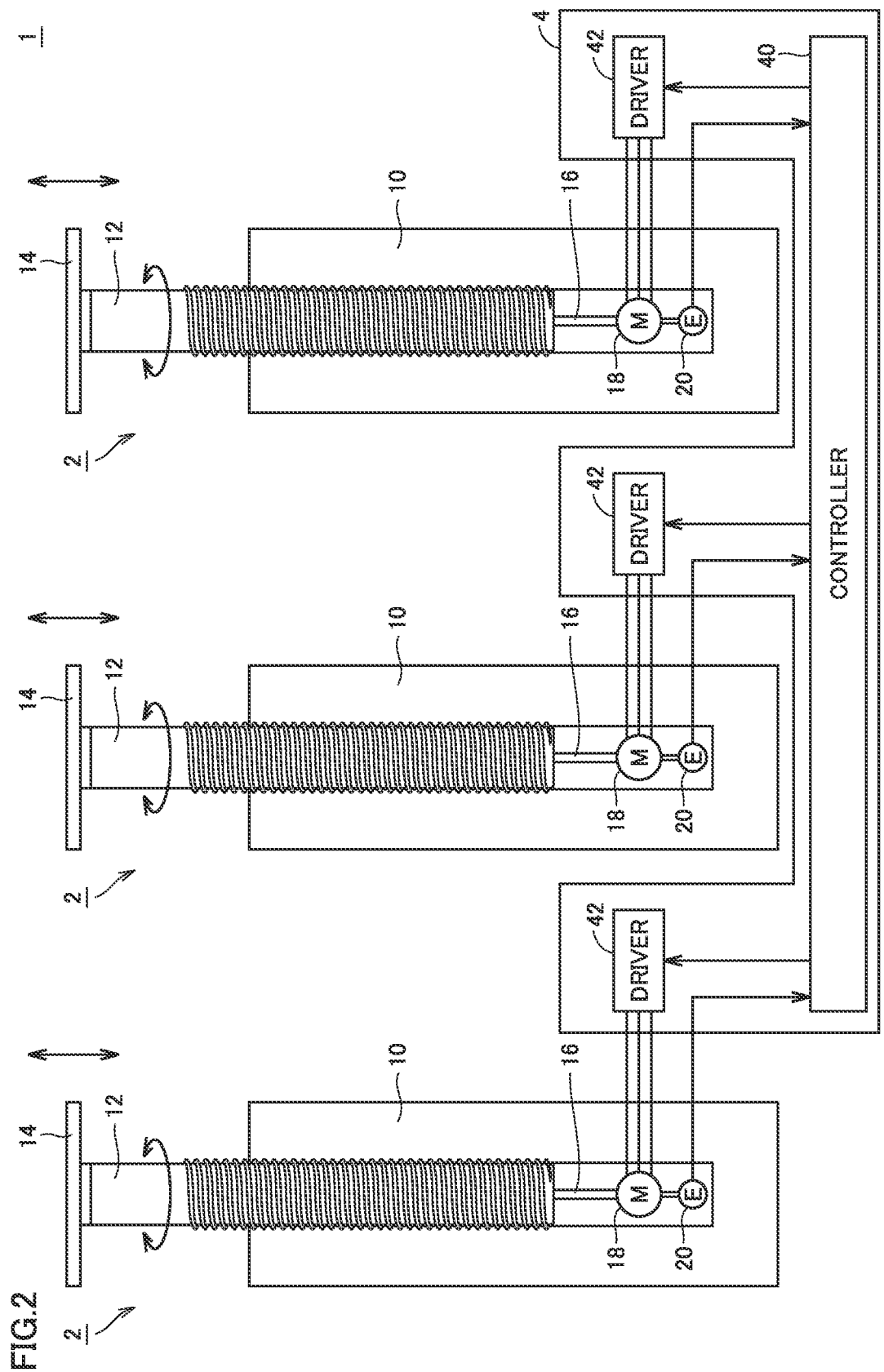
FIG. 2 is a schematic diagram illustrating a main part of a modification in the drive system of the embodiment.

FIG. 2 is a schematic diagram illustrating a main part of a modification in drive system 1 of the embodiment. With reference to FIG. 2, drive system 1 includes three actuators 2. Drive device 4 includes three drivers 42 corresponding to respective actuators 2 and controller 40 that integrally controls three actuators 2.

The number of actuators 2 included in drive system 1 is not particularly limited, and an appropriate number may be set according to an application to be applied. For example, when an arbitrary workpiece can be supported by single actuator 2, the number of actuators 2 may be one. For a large workpiece, a member supporting the workpiece may be driven by a plurality of actuators 2.

For convenience of description, controller 40 and driver 42 are illustrated as independent components, but controller 40 and driver 42 may be mounted as independent devices or may be mounted as an integrated device.

Figure 3C:
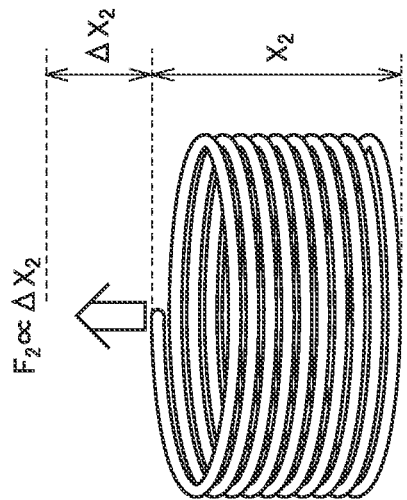
FIGS. 3A to 3C are views each illustrating a behavior of an actuator configuring the drive system of the embodiment.
Figure 3A:
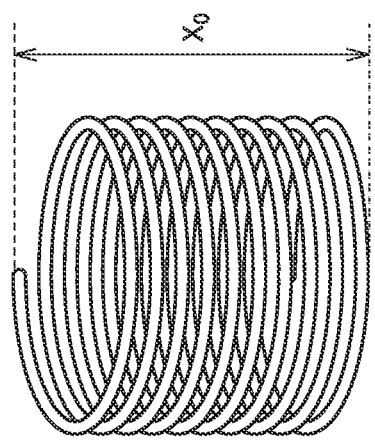
Figure 3B:
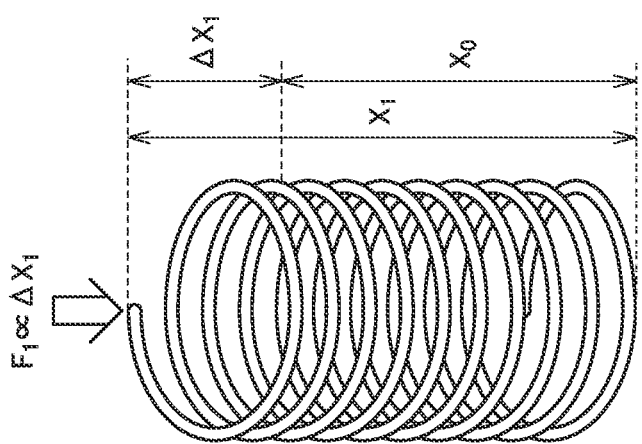

FIGS. 3A to 3C are views each illustrating a behavior of actuator 2 configuring drive system 1 of the embodiment. With reference to FIGS. 3A to 3C, in drive system 1 of the embodiment, actuator 2 is controlled so as to achieve ideal behavior of the spring. For example, the ideal behavior of the spring is assumed to be a spring having a natural length $X_0$ in a state where no external force is applied as illustrated in FIG. 3A.

When the spring is extended to a length $X_1$ (=$X_0$+$\Delta X_1$), restoring force $F_1$ is generated in a direction in which the spring returns to original natural length $X_0$. Restoring force $F_1$ is proportional to an elongation amount $\Delta X_1$ from original natural length $X_0$. On the other hand, when the spring is contracted to a length $X_2$ (=$X_0$-$\Delta X_2$), restoring force $F_2$ is generated in the direction in which the spring returns to original natural length $X_0$. Restoring force $F_2$ is proportional to a contraction amount $\Delta X_2$ from original natural length $X_0$.

As described above, in drive system 1 of the embodiment, what is called a physical spring is implemented by the control of motor 18. The implemented spring exhibits a substantially ideal behavior (behavior according to a physical formula), the creation of control logic using a simple physical model, simulation for facility design, and the like can be easily performed.

A more detailed operation example of actuator 2 of the embodiment will be described later.

<B. Hardware Configuration Example of Controller 40>

A hardware configuration example of controller 40 configuring drive system 1 of the embodiment will be described below.

Figure 4:
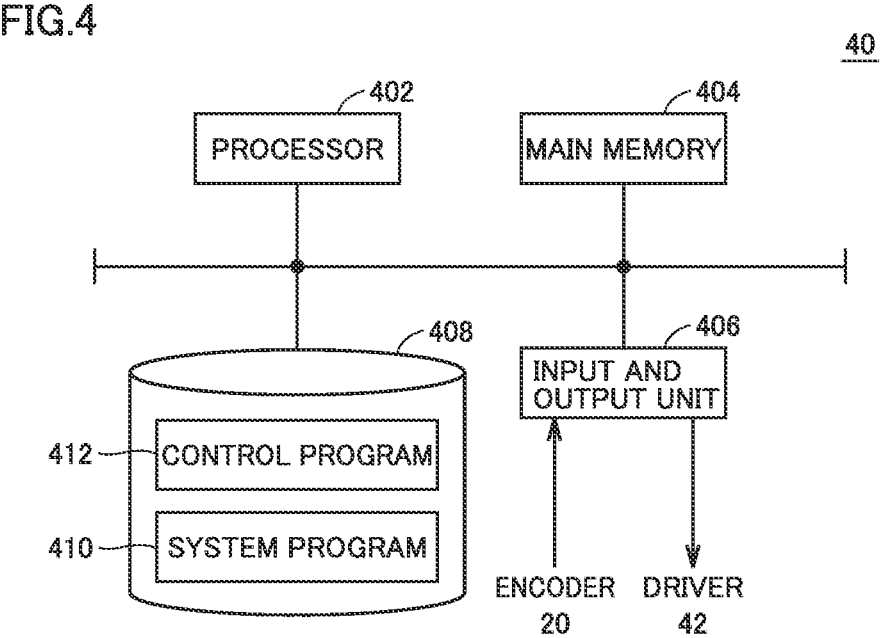
FIG. 4 is a schematic diagram illustrating a hardware configuration example of a controller configuring the drive system of the embodiment.

FIG. 4 is a schematic diagram illustrating the hardware configuration example of controller 40 configuring drive system 1 of the embodiment. With reference to FIG. 4, controller 40 is a type of computer, and includes a processor 402, a main memory 404, an input and output unit 406, and a storage 408 as main hardware components.

Processor 402 is typically configured of a central processing unit (CPU), a micro-processing unit (MPU), or the like, reads a system program 410 and a control program 412 stored in storage 408, expands the system program and the control program in the main memory 404, and executes the system program and the control program to implement control calculation controlling the behavior of actuator 2 as described later.

Input and output unit 406 is in charge of transmission and reception of a signal between controller 40 and an external device. In the example of FIG. 4, input and output unit 406 receives a detection signal from encoder 20 and transmits a control instruction to driver 42.

Storage 408 is typically configured of a solid state disk (SSD) or a fresh memory, and stores system program 410 implementing basic processing and control program 412.

Although the configuration example in which required processing is provided by processor 402 executing the program has been described in FIG. 4, a part or all of provided processing may be implemented using a dedicated hardware circuit (for example, an application specific integrated circuit (ASIC) and a field-programmable gate array (FPGA)).

<C. Impact Absorbing Operation>

An impact absorbing operation of actuator 2 of the embodiment will be described below. In the impact absorbing operation, actuator 2 operates passively according to the applied load.

Figure 5:
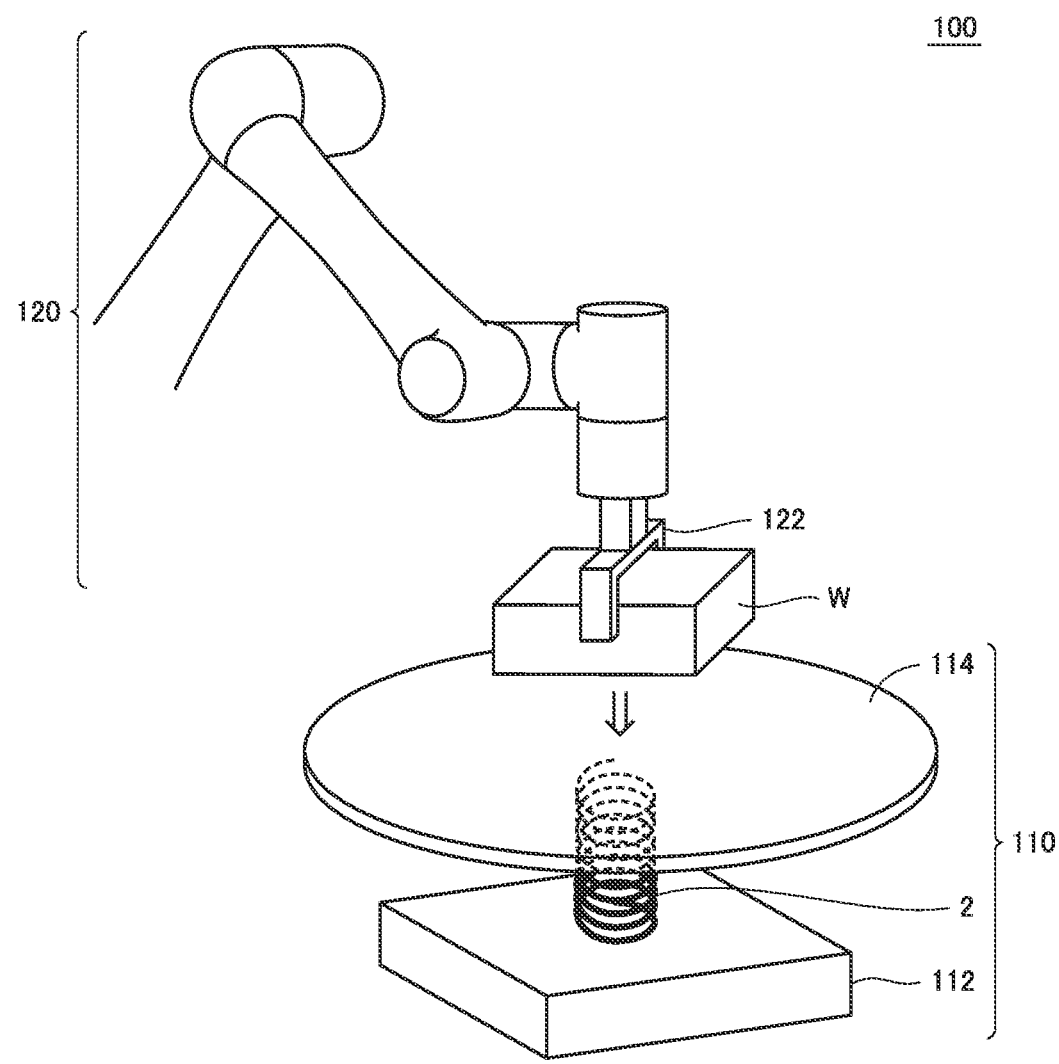
FIG. 5 is a schematic diagram illustrating a workpiece conveyance system in which the actuator of the embodiment performs an impact absorbing operation.

FIG. 5 is a schematic diagram illustrating a workpiece conveyance system 100 in which actuator 2 of the embodiment performs the impact absorbing operation. With reference to FIG. 5, the case where a workpiece W adsorbed by an end effector 122 provided at the distal end of a robot 120 is disposed on a stage mechanism 110 will be described as an example. Stage mechanism 110 includes a base portion 112 and a plate 114. Base portion 112 and plate 114 are mechanically connected with actuator 2 of the embodiment interposed therebetween. In FIG. 5, actuator 2 is illustrated as a spring for easy understanding.

In workpiece conveyance system 100 as illustrated in FIG. 5, when stage mechanism 110 that receives workpiece W does not move when workpiece W is disposed, workpiece W collides with plate 114 and stops. That is, because movement speed of workpiece W greatly changes before and after the collision, a large load (impact force) is applied to workpiece W from stage mechanism 110 by a change in acceleration accompanying the change in the movement speed.

Even when stage mechanism 110 moves along workpiece W, when a contact area between workpiece W and plate 114 is small, the large load is applied to a contact member of workpiece W. Such a phenomenon is also referred to as point load or load concentration.

As illustrated in FIG. 5, in order to absorb an excessive load (impact force) generated when objects come into contact with each other or prevent the generation of the point load, actuator 2 of the embodiment performs the impact absorbing operation.

In the impact absorbing operation, the spring contracts or expands to the position (that is, the balance position) corresponding to the behavior of the spring when an external force is received, namely, the displacement at which restoring force corresponding to the external force is generated. Such the contraction or expansion behavior follows the physical model that is the substantially ideal physical behavior.

Figure 6:
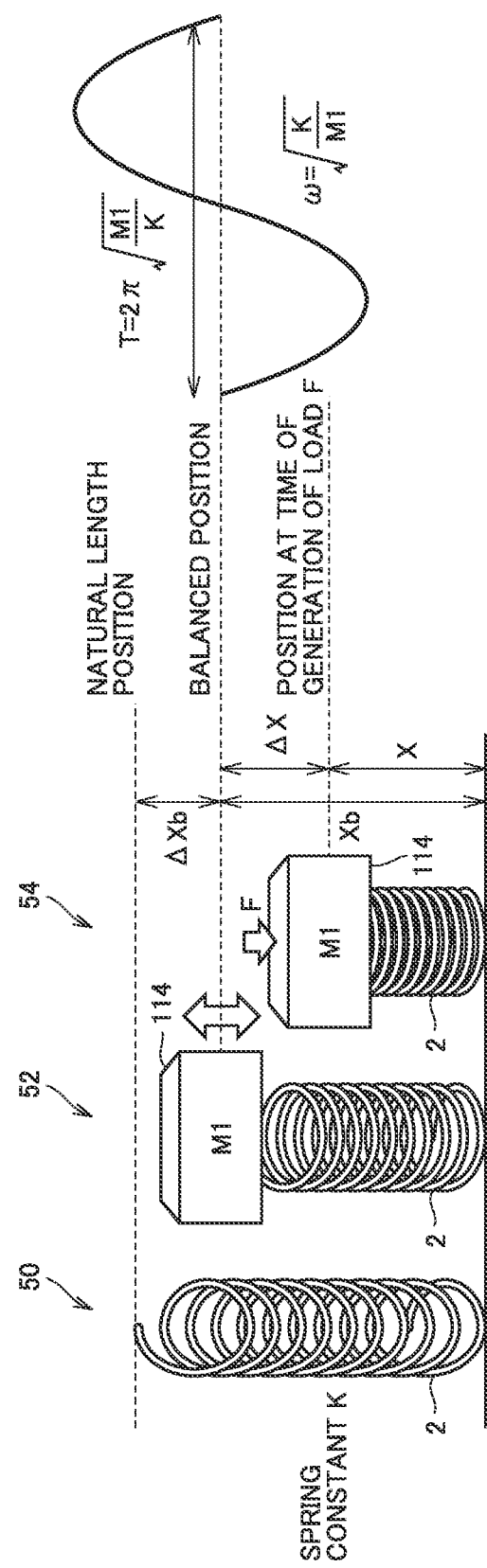
FIG. 6 is a view illustrating the behavior from a physical viewpoint related to the impact absorbing operation of the actuator of the embodiment.

FIG. 6 is a view illustrating the behavior from a physical viewpoint related to the impact absorbing operation of actuator 2 of the embodiment. With reference to FIG. 6, when plate 114 is attached in the state (natural length state 50) where no load is applied to actuator 2 acting as the spring, mass M1 of plate 114 is applied to actuator 2.

Actuator 2 receives the load of mass M1 of plate 114 and is brought into an equilibrium state at the position (balanced position) shortened by a predetermined length ΔXb (balanced state 52). At this point, it is assumed that a length of actuator 2 is Xb.

In the embodiment, the behavior as the spring is calculated based on the balanced position. For example, when a load F is applied to actuator 2, an equilibrium state is established at the position (the position at the time of the generation of load F) shortened by predetermined length ΔX from the balanced position (load equilibrium state 54). At this point, it is assumed that the length of actuator 2 is X.

The behavior as the spring is determined according to collapse from balanced state 52. At this point, for convenience of description, a single vibration model is assumed as the simplest physical model. Considering the behavior as the spring with the balanced position as a reference, when the spring constant of actuator 2 is set to K (which can be arbitrarily set in advance), period T of the single vibration of the spring=$2\pi\sqrt{(M1/K)}$. In addition, the angular frequency $\omega=2\pi/T=(K/M1)$.

That is, when any load F is applied to actuator 2, actuator 2 starts the single vibration with an amplitude A1 corresponding to the magnitude of applied load F. Each value related to the single vibration by actuator 2 is as follows.

Displacement $\Delta X = A1 \times \sin(\omega t)$

Speed $V = A1 \times \omega \times \cos(\omega t)$

Acceleration $a = A1 \times \omega^2 \times \sin(\omega t) = -\omega^2 \Delta X$ As will be described later, the physical model or the like is determined based on displacement ΔX with respect to the state (balance state 52) in which the object is attached to actuator 2.

In drive system 1 of the embodiment, the behavior of the spring is reproduced by actuator 2 using the physical model indicating the behavior of the spring. The physical model may be the single vibration model as described above, a model including an element of the mass indicating mass M1 of plate 114, or a model including an element of damping. These physical models may be determined according to an equation of motion (such as $F = K \times X + M \times V$) for the spring.

Figure 7:
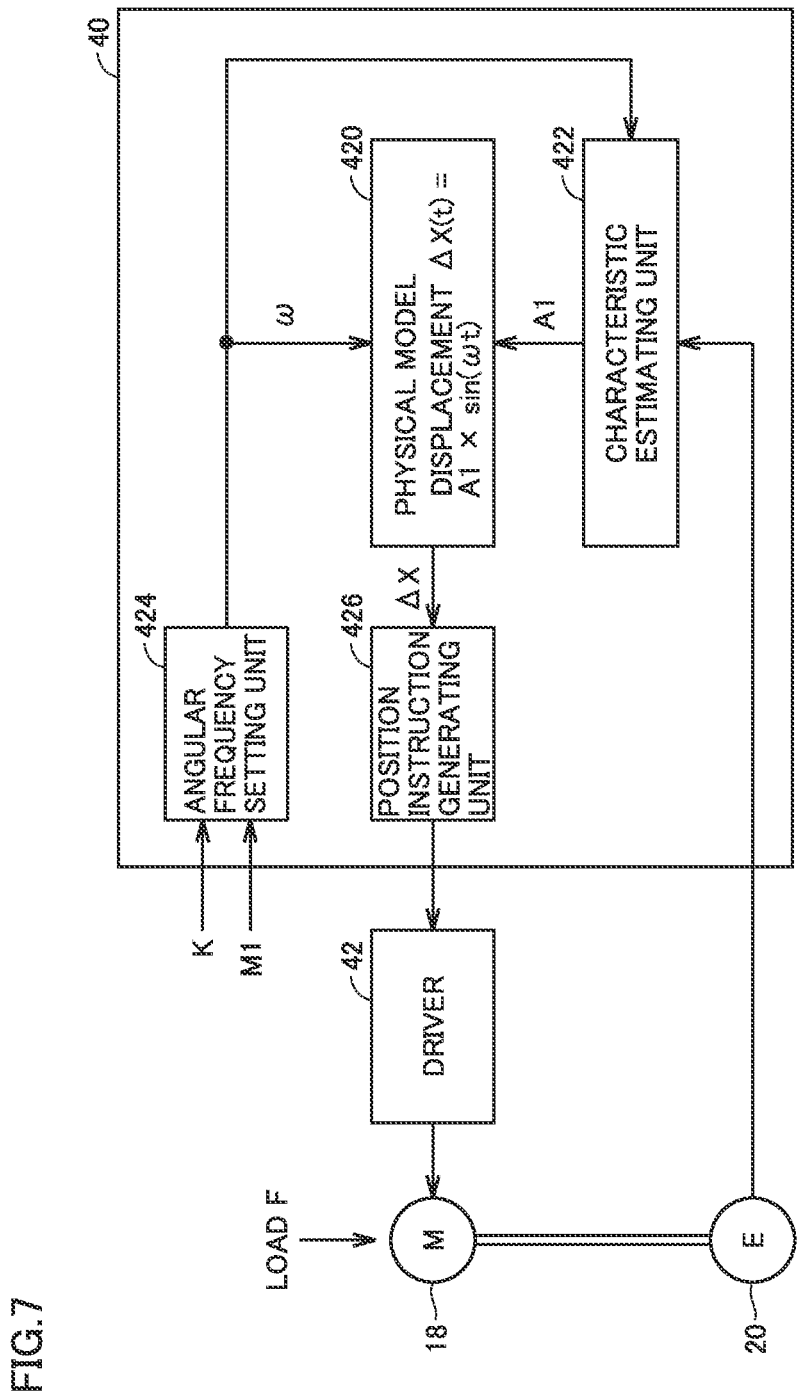
FIG. 7 is a schematic diagram illustrating a main functional configuration implementing the impact absorbing operation by the actuator of the embodiment.

FIG. 7 is a schematic diagram illustrating a main functional configuration implementing the impact absorbing operation by actuator 2 of the embodiment. With reference to FIG. 7, controller 40 includes a physical model 420, a characteristic estimating unit 422, an angular frequency setting unit 424, and a position instruction generating unit 426.

Physical model 420 is a model implementing the behavior as a spring. FIG. 7 illustrates a single vibration model as an example. In this case, physical model 420 calculates the displacement at an arbitrary time t according to displacement $\Delta X(t) = A1 \times \sin(\omega t)$.

Characteristic estimating unit 422 corresponds to the model creation unit creating physical model 420 based on the displacement caused by the application of the external load to actuator 2. More specifically, characteristic estimating unit 422 estimates a parameter (in the example illustrated in FIG. 7, amplitude A1) included in physical model 420 based on the detection signal from encoder 20. The estimated parameter is reflected in physical model 420. The characteristic (parameter) of physical model 420 is determined based on a change caused by the application of arbitrary load F to actuator 2.

For example, when physical model 420 is the single vibration model, amplitude A1 of physical model 420 can be calculated based on a position change (speed) immediately after arbitrary load F is applied to actuator 2.

As described above, characteristic estimating unit 422 estimates the parameter of physical model 420 based on the temporal change in the displacement of actuator 2 (speed, acceleration, jerk, or the like). The estimated parameter is appropriately determined according to physical model 420. For example, a spring constant or a damping constant may be determined. As described above, because the parameter of the physical model is estimated when significant displacement is generated in actuator 2, physical model 420 has the characteristic corresponding to a predetermined load to actuator 2 from the outside.

Angular frequency setting unit 424 sets angular frequency ω of physical model 420 based on mass M1 of the object (in the example of FIGS. 5 and 6, plate 114) attached to actuator 2 and previously-set spring constant K. More specifically, angular frequency setting unit 424 sets angular frequency ω based on spring constant K set in advance and known mass M1. As described above, angular frequency ω is calculated as $\omega = 2\pi/T = \Pi(K/M1)$.

Position instruction generating unit 426 generates the control instruction such that actuator 2 is displaced in accordance with physical model 420. More specifically, position instruction generating unit 426 generates the control instruction (position instruction or displacement instruction) in each control period based on displacement ΔX calculated according to physical model 420, and outputs the control instruction to driver 42. That is, position instruction generating unit 426 may output the position instruction that designates the target position of motor 18 as the control instruction.

The parameters defining physical model 420 is estimated by the above processing procedure. Then, the behavior of actuator 2 is determined according to physical model 420 including the estimated parameter.

The single vibration of actuator 2 causes actuator 2 to generate a load $F_a = K \times X + M1 \times V$ against load F by workpiece W. That is, load $F_a$ reflects moment generated by the movement of plate 114 (mass M1).

As described above, in the impact absorbing operation of the embodiment, a physical spring (operation as a damper) is implemented by the control of motor 18. The control is performed based on the balanced position, so that the behavior according to the physical formula can be implemented even when the applied load is small. Because the behavior follows the physical formula, preliminary calculation, simulation, and the like in designing the control system are facilitated, and a deviation from the preliminary design is reduced even in the case where the actual device is configured.

In general, in a mechanism including a plurality of components, resistance between the components exists, and magnitude of the existing resistance changes depending on the surrounding environment, use history, and the like, so that it is difficult to perform pre-calculation and the like. On the other hand, in the impact absorbing operation of the embodiment, the behavior according to the physical formula can be implemented without depending on the magnitude of the resistance between the components. Furthermore, actuator 2 of the embodiment is driven by motor 18, so that the spring can be implemented with improved responsiveness and flexibility.

<D. Elastic Force Generating Operation>

An elastic force generating operation of actuator 2 of the embodiment will be described below. In the elastic force generating operation, the load calculated according to Hooke's law ($F_a$=spring constant K x displacement $\Delta X$) is generated. In the embodiment, when spring constant K is varied, the target load (elastic force) can be applied to workpiece W or the like.

Figure 8A:
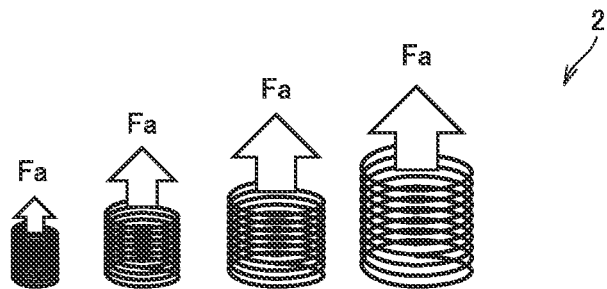
FIGS. 8A to 8D are views illustrating an elastic force generating operation of the actuator of the embodiment.
Figure 8B:
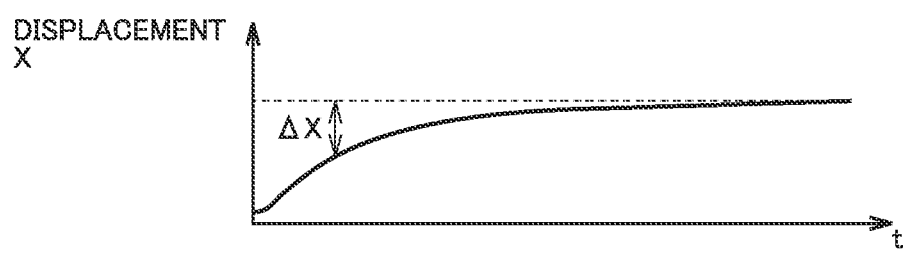

FIGS. 8A to 8D are views illustrating the elastic force generating operation of actuator 2 of the embodiment. With reference to FIG. 8A, it is assumed that the case where actuator 2 generates the displacement according to the physical model. As an example, in the case where actuator 2 changes from the contracted state to the extended state, a temporal change in displacement of FIG. 8B is illustrated.

When spring constant K is constant, load F a proportional to displacement $\Delta X$ (the change from the natural length) is generated, but the magnitude of generated load $F_a$ can be adjusted by temporally changing spring constant K.

Figure 8C:
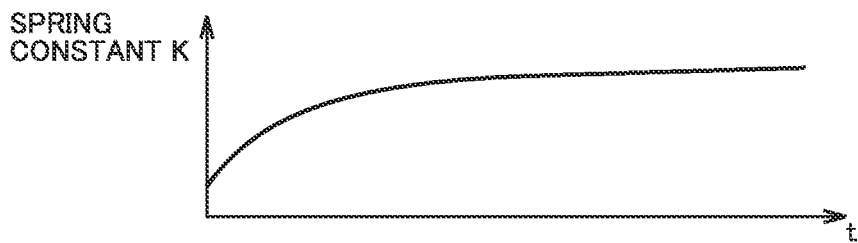
Figure 8D:
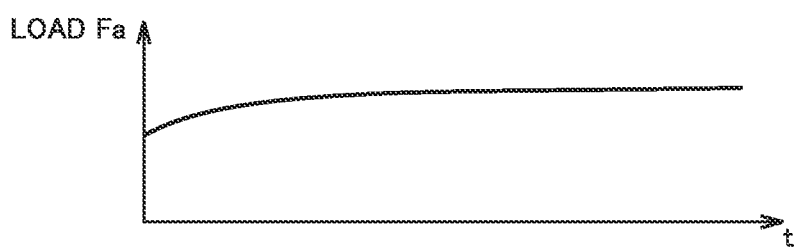

For example, as illustrated in FIG. 8C, the magnitude of load $F_a$ changes as illustrated in FIG. 8D by temporally changing spring constant K. In the example of FIG. 8D, the fluctuation of generated load $F_a$ is prevented by increasing spring constant K along the lapse of time.

In addition, in the case where the required load $F_a$ is previously set, spring constant K corresponding to displacement $\Delta X$ may be calculated in each control period.

Figure 9:
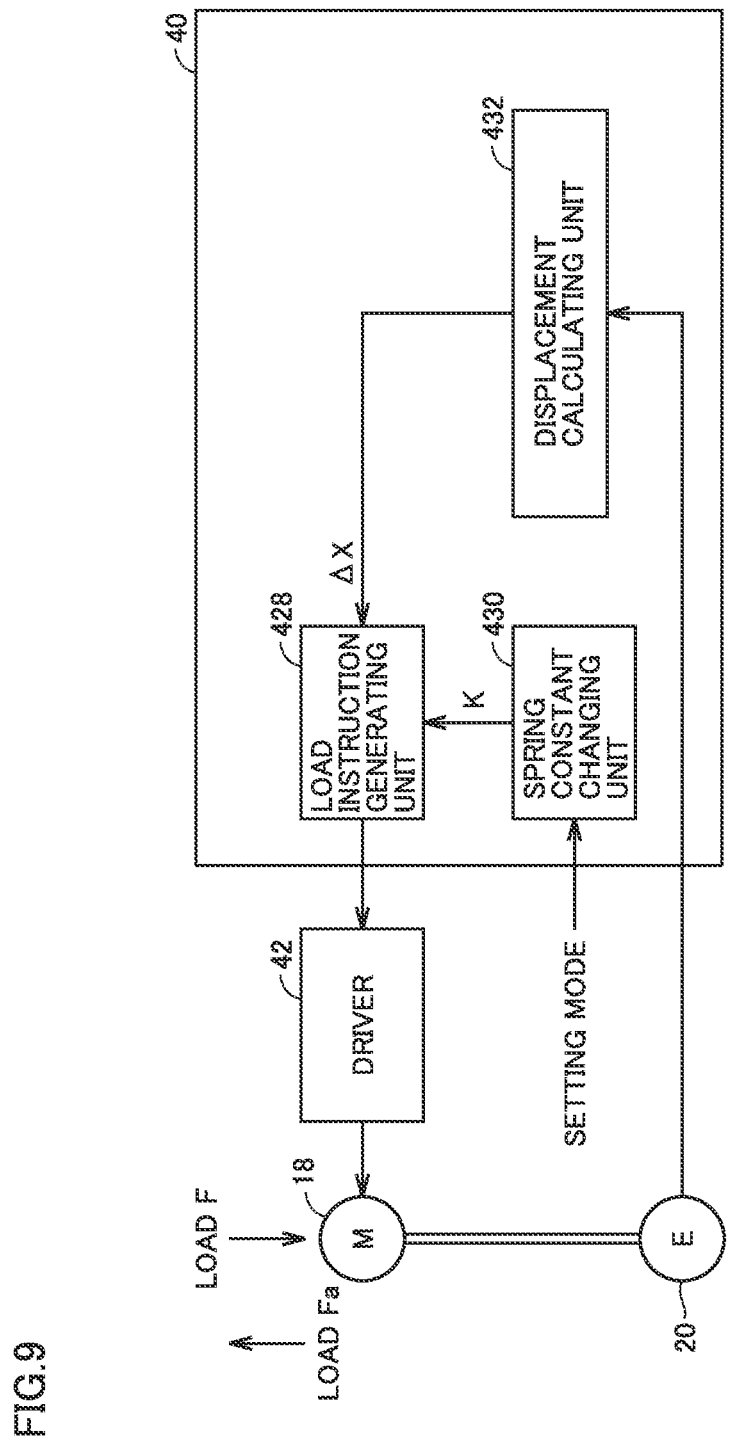
FIG. 9 is a schematic diagram illustrating the main functional configuration implementing the elastic force generating operation by the actuator of the embodiment.

FIG. 9 is a schematic diagram illustrating the main functional configuration implementing the elastic force generating operation by actuator 2 of the embodiment. With reference to FIG. 9, controller 40 includes a load instruction generating unit 428, a spring constant changing unit 430, and a displacement calculating unit 432.

Spring constant changing unit 430 corresponds to the determination unit that determines spring constant K. Spring constant changing unit 430 may set spring constant K for each arbitrary section, or may set spring constant K for each control period. As an example, spring constant changing unit 430 sets spring constant K (t) in each control period according to a predetermined pattern.

Spring constant changing unit 430 may have a pattern outputting spring constant K (t) as illustrated in FIG. 8C. When a plurality of types of workpieces W exist, a plurality of patterns of the spring constant may be stored in spring constant changing unit 430. In that case, one of the plurality of patterns may be selected according to a setting mode.

Displacement calculating unit 432 calculates displacement $\Delta X$ generated in actuator 2 based on the detection signal from encoder 20. Displacement $\Delta X$ calculated by displacement calculating unit 432 is calculated based on the state where the object (in the example of FIGS. 5 and 6, plate 114) is attached to actuator 2. Load instruction generating unit 428 generates the control instruction so as to generate the drive force calculated based on a product of spring constant K and displacement $\Delta X$ generated in actuator 2. More specifically, load instruction generating unit 428 calculates load $F_a$ (=K(t)×$\Delta X$) to be generated in each control period based on displacement $\Delta X$ calculated by displacement calculating unit 432 and spring constant K (t) from spring constant changing unit 430, generates the control instruction (typically, a torque instruction) so as to generate calculated load $F_a$, and outputs the control instruction to driver 42. That is, load instruction generating unit 428 may output the torque instruction that designates torque to be generated by motor 18 as the control instruction.

By the above processing procedure, load F a corresponding to displacement $\Delta X$ and spring constant K can be generated from actuator 2. Actually, because the moment generated by the movement of plate 114 (mass M1) is reflected, actuator 2 generates load $F_a$=K×X+M1×V.

When the physical model including the element of the damping is adopted, the damping constant may be temporally changed in addition to or instead of spring constant K.

As described above, in the elastic force generating operation of the embodiment, the physical spring (operation as the damper) is implemented by the control of motor 18. Because the behavior follows the physical formula, preliminary calculation, simulation, and the like in designing the control system are facilitated, and a deviation from the preliminary design is reduced even in the case where the actual device is configured.

In addition, in the elastic force generating operation of the embodiment, because the load is generated in proportion to the displacement generated in the actuator, a sensor or the like that measures the external force (load from the outside) becomes unnecessary. Accordingly, even in a manufacturing device having high rigidity or a manufacturing device having a non-negligible internal resistance, the generated load can be precisely controlled.

In addition, the spring constant can be changed in the elastic force generating operation of the embodiment, so that the target load according to the application can be generated while following the physical formula of generating the load in proportion to the displacement generated in the actuator.

<E. Impact Absorbing Operation and Elastic Force Generating Operation>

The generation of the large load (impact force) can be prevented when workpiece W comes into contact with workpiece W or the like by switching between the impact absorbing operation and the elastic force generating operation.

Figure 10:
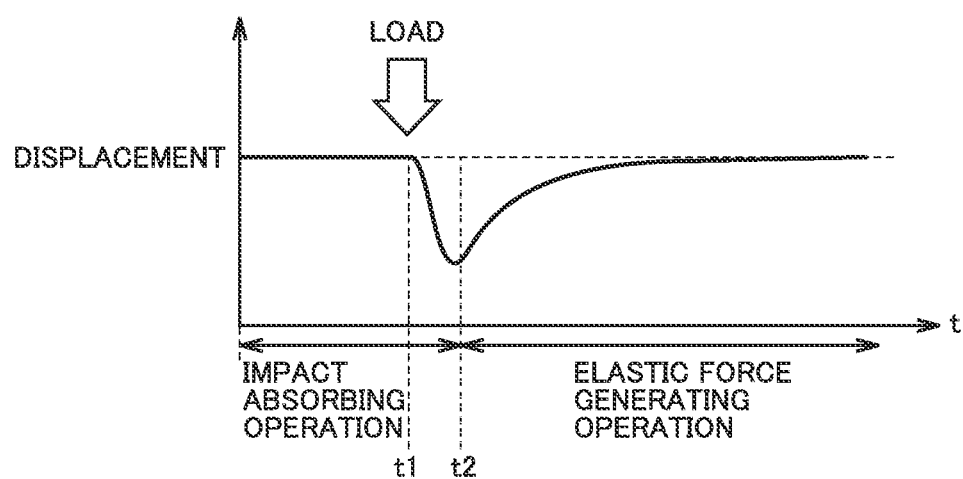
FIG. 10 is a view illustrating processing for preventing generation of impact force due to contact between objects using the actuator of the embodiment.

FIG. 10 is a view illustrating processing for preventing the generation of the impact force due to contact between objects using actuator 2 of the embodiment. With reference to FIG. 10, when the impact absorbing operation is previously executed to apply some load, actuator 2 operates passively according to the applied load. Thereafter, the operation is switched to the elastic force generating operation under a predetermined switching condition, and the load calculated based on the spring constant defined by the generated displacement and pattern is generated.

In the impact absorbing operation, actuator 2 is not displaced at all unless the external force (external load) is applied. When the external force is applied, the parameter corresponding to the applied external force is calculated, and the displacement of actuator 2 is controlled by the physical model having the calculated parameter.

The switching condition switching between the impact absorbing operation and the elastic force generating operation may be based on the elapsed time after the load is applied to actuator 2 from the outside, the displacement (current position) generated in actuator 2, a trigger from the external device, or the like.

Figure 11:
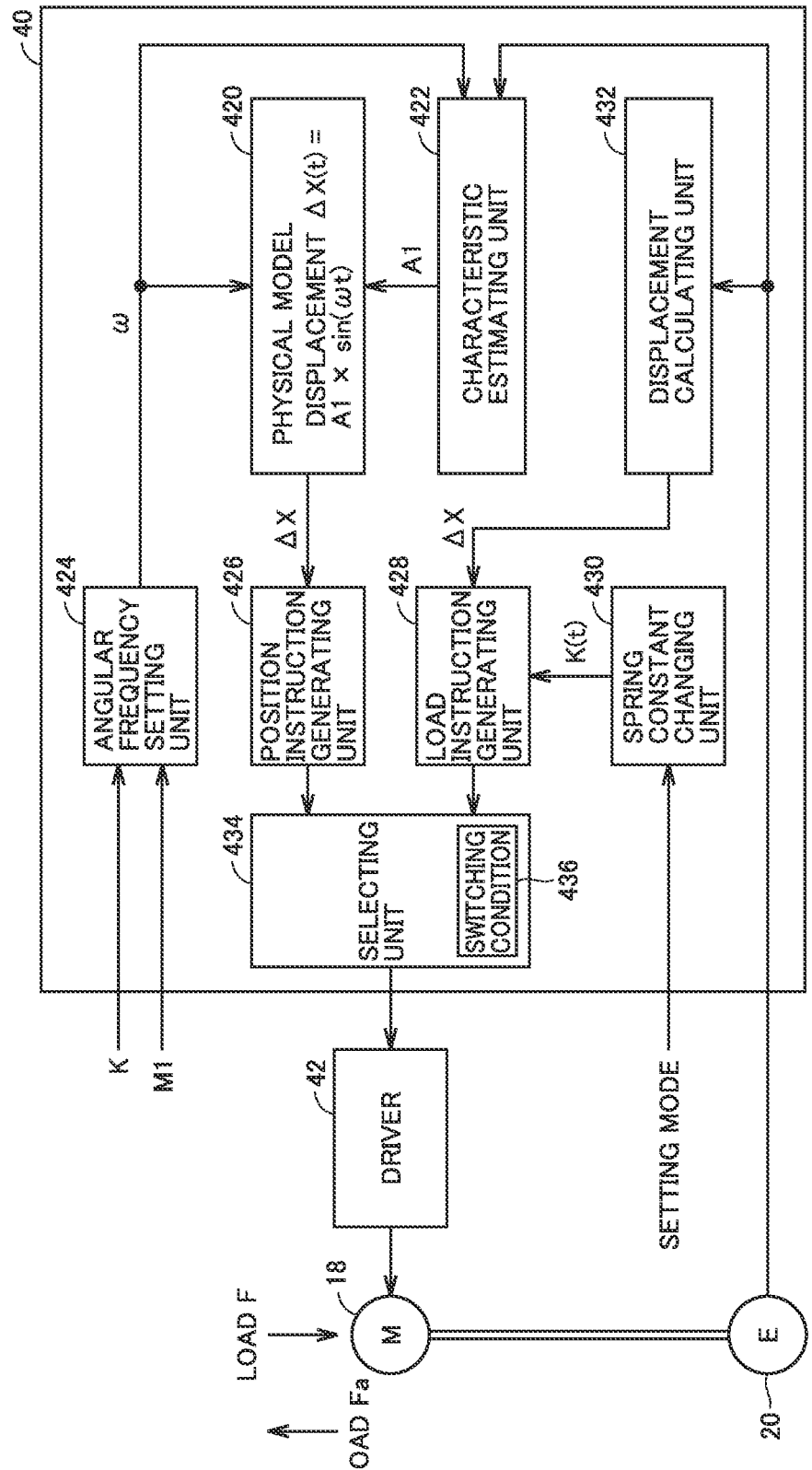
FIG. 11 is a schematic diagram illustrating a main functional configuration implementing the impact absorbing operation and the elastic force generating operation by the actuator of the embodiment.

FIG. 11 is a schematic diagram illustrating the main functional configuration implementing the impact absorbing operation and the elastic force generating operation by actuator 2 of the embodiment. With reference to FIG. 11, controller 40 includes physical model 420, characteristic estimating unit 422, angular frequency setting unit 424, position instruction generating unit 426, load instruction generating unit 428, spring constant changing unit 430, displacement calculating unit 432, and a selecting unit 434.

The functional configuration in FIG. 11 corresponds to addition of selecting unit 434 after a combination of the functional configuration implementing the impact absorbing operation in FIG. 7 and the functional configuration implementing the elastic force generating operation in FIG. 9. That is, selecting unit 434 selects one of the control instruction implementing the impact absorbing operation output from position instruction generating unit 426 and the control instruction implementing the elastic force generating operation output from load instruction generating unit 428 to be validated.

Selecting unit 434 has a switching condition 436, and selects and outputs one of the control instruction output from position instruction generating unit 426 and the control instruction output from load instruction generating unit 428 based on whether switching condition 436 is satisfied. Typically, selecting unit 434 validates the control instruction from load instruction generating unit 428 when switching condition 436 is satisfied while the control instruction from position instruction generating unit 426 is validated.

Figure 12:
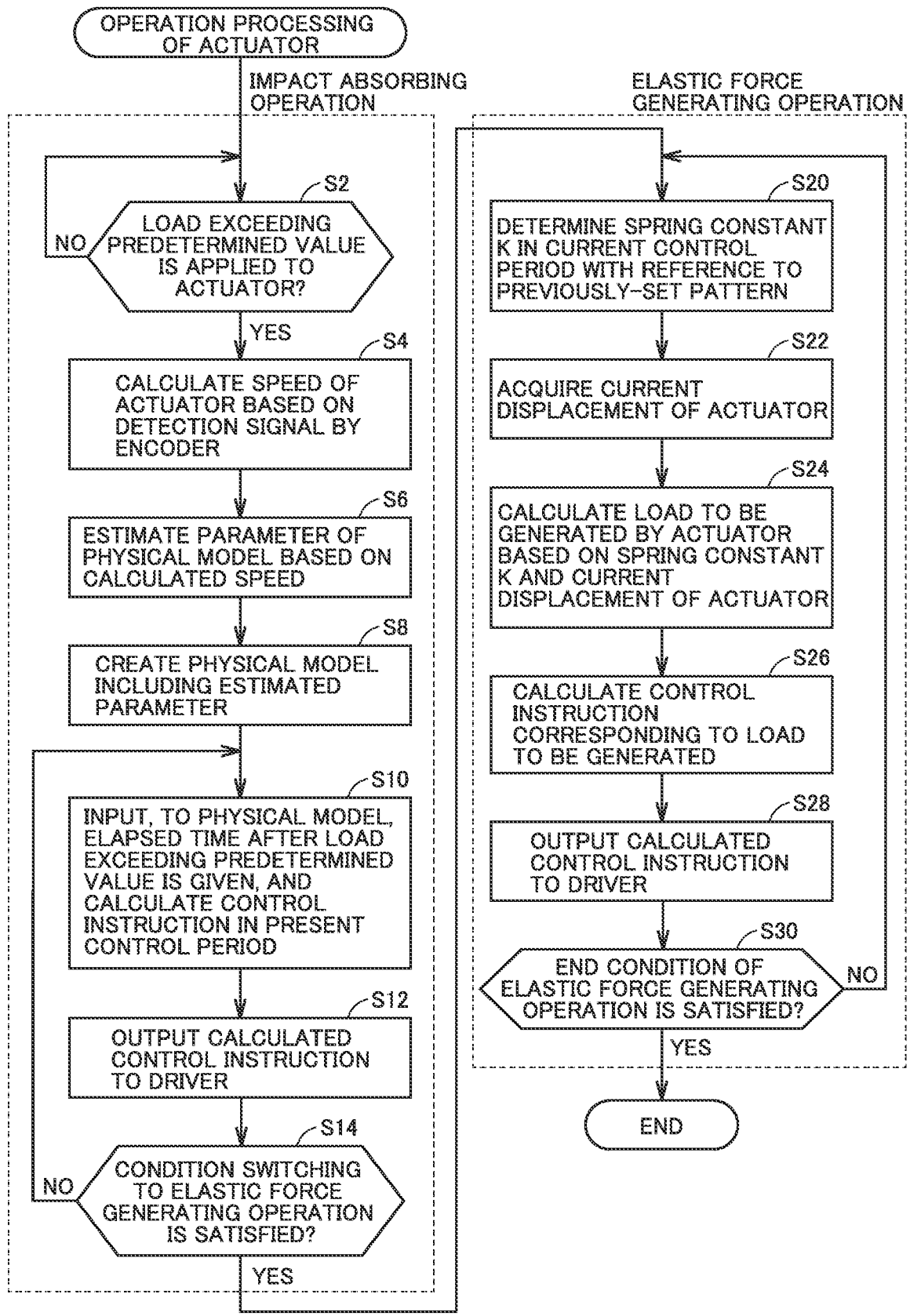
FIG. 12 is a flowchart illustrating an example of a processing procedure related to the impact absorbing operation and the elastic force generating operation by the actuator of the embodiment.

FIG. 12 is a flowchart illustrating an example of a processing procedure related to the impact absorbing operation and the elastic force generating operation by actuator 2 of the embodiment. Typically, processor 402 of controller 40 executes control program 412 to implement each step in FIG. 12. When processor 402 executes control program 412, a library or the like provided by system program 410 may be used as a part of the processing.

In the processing of FIG. 12, steps S2 to S14 correspond to processing related to the impact absorbing operation, and steps S20 to S28 correspond to processing related to the elastic force generating operation.

That is, controller 40 first performs the processing related to the impact absorbing operation. More specifically, controller 40 determines whether the load exceeding a predetermined value is applied to actuator 2 based on the detection signal from encoder 20 (step S2). When the load exceeding the predetermined value is not applied to actuator 2 (NO in step S2), the pieces of processing from step S2 are repeated.

When the load exceeding the predetermined value is applied to actuator 2 (YES in step S2), controller 40 calculates the speed of actuator 2 based on the detection signal by encoder 20 (step S4), and estimates the parameter of the physical model based on the calculated speed (step S6). Then, controller 40 creates the physical model including the estimated parameter (step S8). In this manner, controller 40 creates the physical model based on the displacement caused by the application of the load from the outside to actuator 2.

Controller 40 inputs the elapsed time after the load exceeding the predetermined value is applied to actuator 2 to the physical model, calculates the control instruction (the position instruction or the displacement instruction) in the current control period (step S10), and outputs the calculated control instruction to driver 42 (step S12). That is, controller 40 controls motor 18 such that actuator 2 generates the displacement according to the physical model.

Then, controller 40 determines whether the condition switching to the elastic force generating operation (switching condition 436) is satisfied (step S14). When the condition switching to the elastic force generating operation is not satisfied (NO in step S14), the pieces of processing from step S10 are repeated.

When the condition switching to the elastic force generating operation is satisfied (YES in step S14), controller 40 performs the processing related to the following elastic force generating operation. More specifically, controller 40 determines spring constant K in the current control period with reference to the previously-set pattern (step S20). In this manner, controller 40 determines spring constant K.

Subsequently, controller 40 acquires the current displacement of actuator 2 (step S22), and calculates the load to be generated by actuator 2 based on spring constant K and the current displacement of actuator 2 (step S24). Then, controller 40 calculates the control instruction (the position instruction or the displacement instruction) corresponding to the load to be generated (step S26), and outputs the calculated control instruction to driver 42 (step S28). In this manner, controller 40 controls motor 18 so as to generate drive force calculated based on the product of spring constant K and displacement ΔX generated in actuator 2.

As described above, when the predetermined switching condition is satisfied while actuator 2 is performing the impact absorbing operation (when the motor is controlled so as to generate the displacement according to physical model), controller 40 switches the control of motor 18 so as to generate the drive force calculated based on the product of spring constant K and displacement ΔX generated in actuator 2.

Then, controller 40 determines whether an end condition of the elastic force generating operation is satisfied (step S30). When the end condition of the elastic force generating operation is not satisfied (NO in step S30), the pieces of processing from step S20 are repeated.

When the end condition of the elastic force generating operation is satisfied (YES in step S30), the processing ends.

Although FIG. 12 illustrates the processing example in which the impact absorbing operation and the elastic force generating operation by actuator 2 of the embodiment are combined, only the impact absorbing operation and only the elastic force generating operation may be performed. An appropriate operation is selected according to the application using actuator 2.

<F. Example of Drive Mechanism>

For convenience of description, the configuration including single actuator 2 has been exemplified, but a mechanism including the plurality of actuators 2 may be implemented. An example of the drive mechanism including actuator 2 will be described below.

(f1: Stage Mechanism with One Degree of Freedom)

Figure 13A:
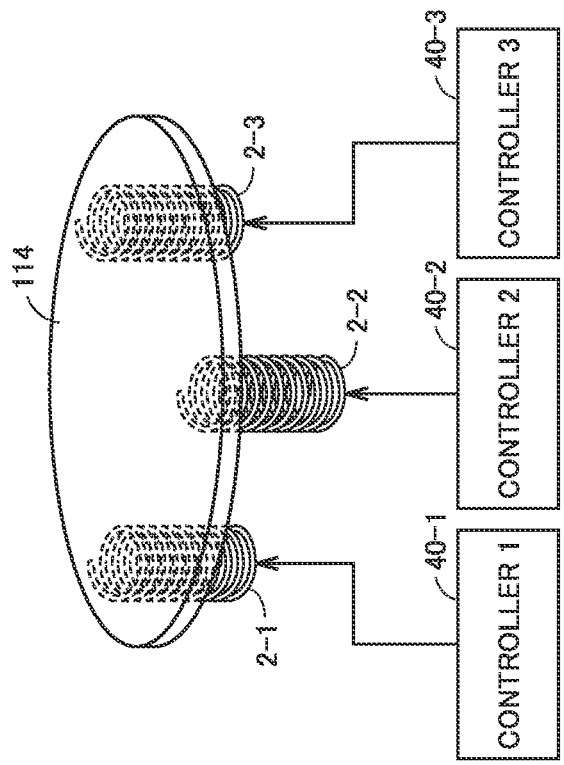
FIGS. 13A and 13B are schematic views each illustrating an example of a stage mechanism with one degree of freedom including a plurality of actuators of the embodiment.
Figure 13B:
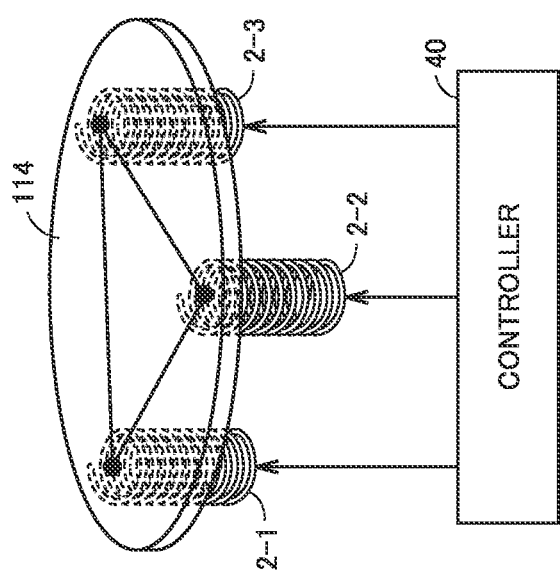

FIGS. 13A and 13B are schematic views each illustrating an example of a stage mechanism with one degree of freedom including the plurality of actuators 2 of the embodiment. FIGS. 13A and 13B illustrate a configuration example of the stage mechanism in which plate 114 is supported by three actuators 2-1, 2-2, 2-3. In the stage mechanism of FIGS. 13A and 13B, the plurality of actuators 2 are mechanically connected to plate 114 that is a common member.

In the stage mechanism of FIG. 13A, controller 40 synchronously controls actuators 2-1, 2-2, 2-3, so that the entire surface of plate 114 can be controlled. At this point, controller 40 generates the control instructions for the actuators 2-1, 2-2, 2-3 such that the target load is generated from plate 114 that is the common member.

In the stage mechanism of FIG. 13B, controllers 40-1, 40-2, 40-3 control actuators 2-1, 2-2, 2-3, respectively. Each of actuators 2-1, 2-2, 2-3 is independently controlled, so that the behavior corresponding to a local load can be performed even when the local load is applied to plate 114.

Figure 14:
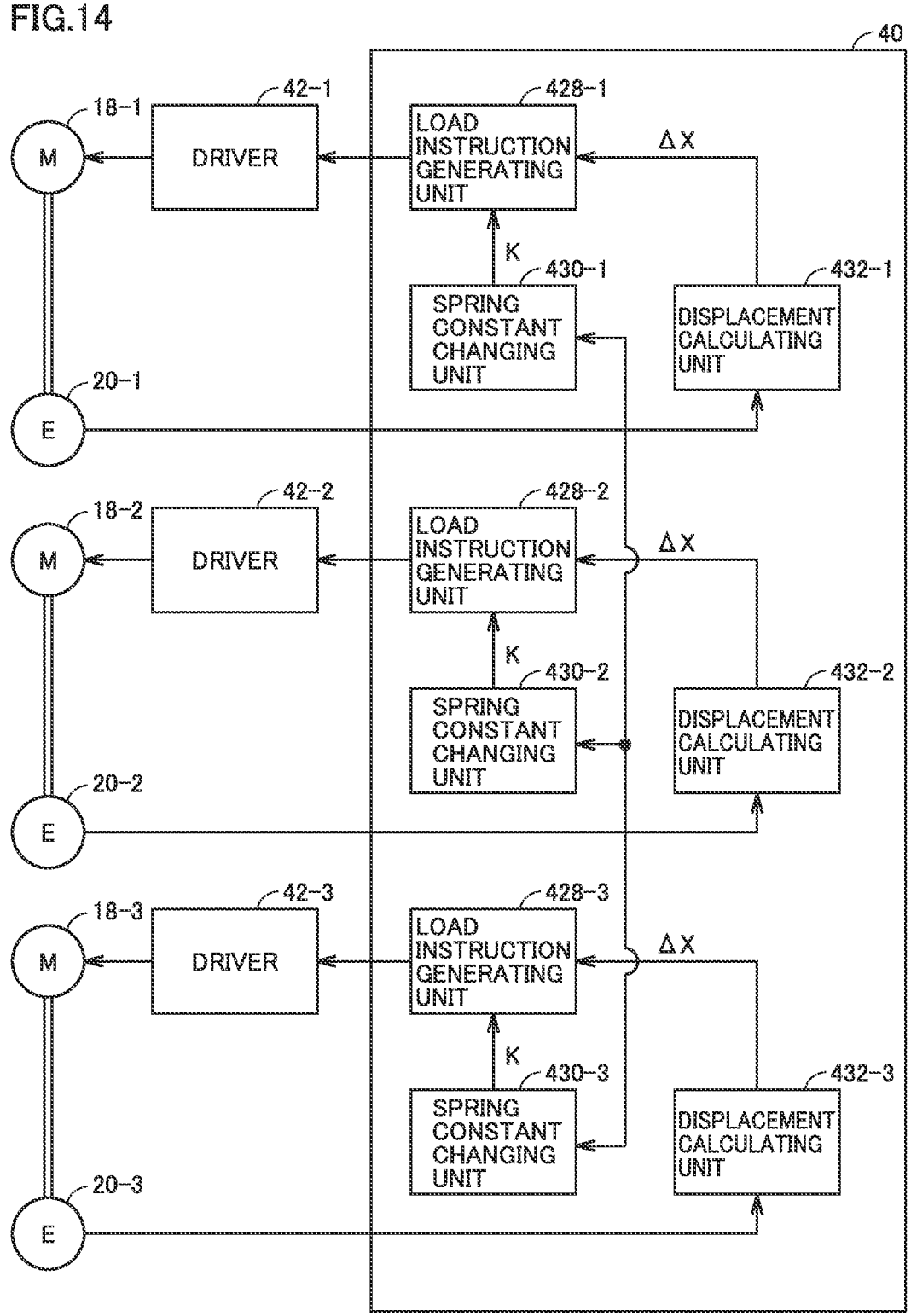
FIG. 14 is a schematic diagram illustrating a main functional configuration implementing the elastic force generating operation by the stage mechanism in FIG. 13A.

FIG. 14 is a schematic diagram illustrating the main functional configuration implementing the elastic force generating operation by the stage mechanism in FIG. 13A. With reference to FIG. 14, actuators 2-1, 2-2, 2-3 are driven by drivers 42-1, 42-2, 42-3, and the displacement is detected by encoders 20-1, 20-2, 20-3.

Controller 40 includes load instruction generating units 428-1, 428-2, 428-3, spring constant changing units 430-1, 430-2, 430-3, and displacement calculating units 432-1, 432-2, 432-3 in order to control actuators 2-1, 2-2, 2-3.

In order to control the load generated by the entire surface of plate 114, the timing at which each spring constant is changed or updated is controlled among spring constant changing units 430-1, 430-2, 430-3. The spring constants may be gradually changed in synchronization, or the spring constants may be arbitrated so as to correct the variation in the displacement.

The load generated by plate 114 can be controlled on the entire surface by adopting such the control logic.

In the impact absorbing operation, the physical models corresponding to the actuators are synchronized with each other, so that the load generated in plate 114 can be controlled on the entire surface.

(f2: Stage Mechanism with Multiple Degrees of Freedom)

Figure 15:
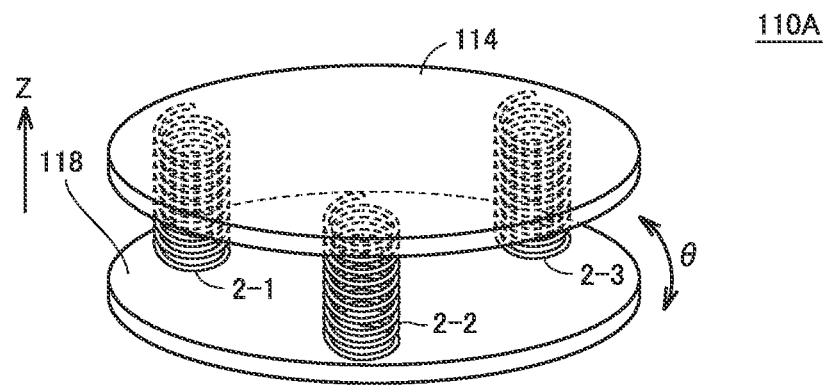
FIG. 15 is a schematic view illustrating an example of a multi-degree-of-freedom stage mechanism including the plurality of actuators of the embodiment.

FIG. 15 is a schematic view illustrating an example of a multi-degree-of-freedom stage mechanism 110A including the plurality of actuators 2 of the embodiment.

With reference to FIG. 15, stage mechanism 110A is a Zθ-stage having two degrees of freedom. More specifically, stage mechanism 110A includes a rotating member 118 configured to rotate in a θ-axis direction and three actuators 2-1, 2-2, 2-3 extending in a Z-axis direction.

The use of stage mechanism 110A in FIG. 15 enables the use in various applications.

(f3: Others)

As described above, actuator 2 of the embodiment can be used alone or as the stage incorporating actuator 2. Furthermore, actuator 2 can also be used as a manufacturing device including the stage.

G. Application Examples

An example of the application using actuator 2 of the embodiment will be described.

Figure 16B:
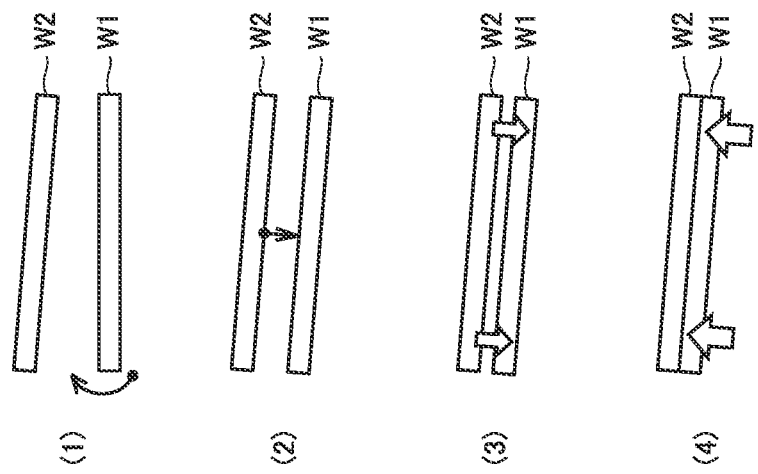
FIGS. 16A and 16B are schematic diagrams illustrating an example of an application using the actuator of the embodiment.
Figure 16A:
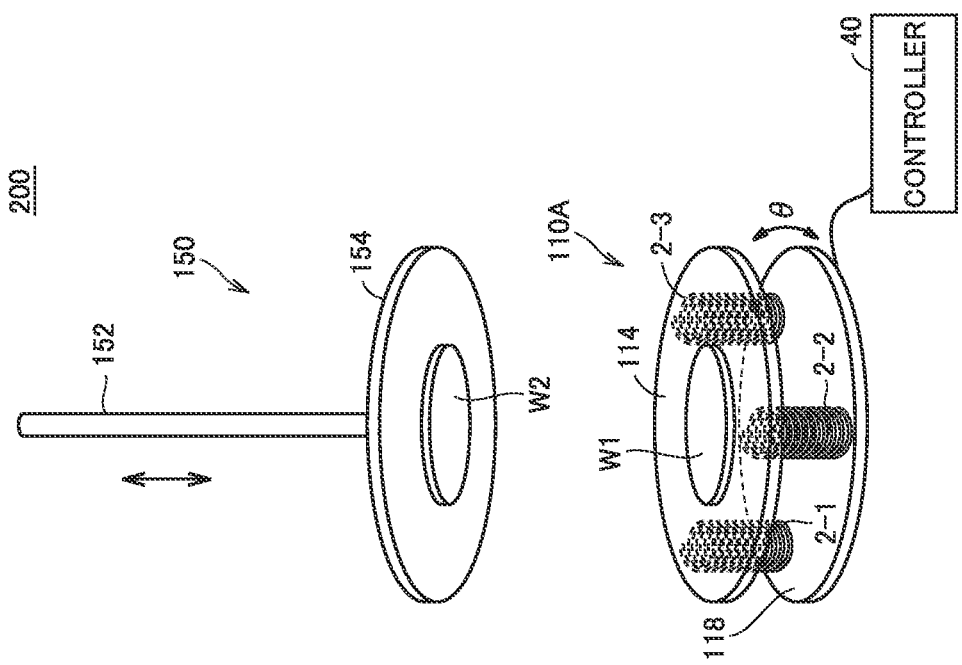

FIGS. 16A and 16B are schematic diagrams illustrating an example of the application using actuator 2 of the embodiment. FIGS. 16A and 16B illustrate the application superimposing the workpieces in order to paste a workpiece W1 and a workpiece W2.

With reference to FIG. 16A, an assembly device 200 in which two workpieces are overlapped includes stage mechanism 110A, a conveyance mechanism 150, and controller 40. Workpiece W1 is disposed on plate 114 of stage mechanism 110A. Workpiece W2 superimposed on workpiece W1 is conveyed by conveyance mechanism 150 from above stage mechanism 110A. Controller 40 gives the control instruction to stage mechanism 110A to control stage mechanism 110A.

Stage mechanism 110A includes one or the plurality of actuators 2 that are driven by motor 18 to generate the displacement in a first direction (Z-axis direction). Because the configuration of stage mechanism 110A has been described with reference to FIG. 15, the detailed description will not be repeated.

Conveyance mechanism 150 includes a support column 152 and a plate 154. Plate 154 is connected to support column 152 and is movable in the vertical direction of gravity by a drive mechanism (not illustrated).

Adsorption holes are made on the surface of plate 154. Workpiece W2 is conveyed in the state of being adsorbed to the surface of plate 154 by an adsorption mechanism (not illustrated).

With reference to FIG. 16B, the processing procedure in assembly device 200 will be described below.

First, the displacement of actuators 2-1, 2-2, 2-3 of stage mechanism 110A is adjusted such that workpiece W1 and workpiece W2 are parallel to each other ((1) a parallel maintaining operation). That is, controller 40 gives the control instruction to stage mechanism 110A such that workpiece W1 and workpiece W2 are parallel to each other according to workpiece W2 superimposed on workpiece W1.

The parallel maintaining operation may be implemented by feedback control based on a detection signal by a sensor (not illustrated) provided in conveyance mechanism 150. In the parallel maintaining operation, a predetermined distance margin is provided between the workpieces such that workpiece W1 and workpiece W2 do not collide with each other by orientation adjustment.

After workpiece W1 and workpiece W2 are adjusted to be parallel by the parallel maintaining operation, the control is performed to reduce the distance between workpiece W1 and workpiece W2, namely, to superimpose workpiece W2 on workpiece W1 ((2) a workpiece approaching operation). In the workpiece approaching operation, conveyance mechanism 150 brings workpiece W2 close to workpiece W1 and adjusts the displacement of actuators 2-1, 2-2, 2-3 of stage mechanism 110A to maintain workpiece W1 and workpiece W2 in parallel.

Immediately before workpiece W1 and workpiece W2 come into contact with each other, the impact absorbing operation is started ((3) the impact absorbing operation). That is, controller 40 creates the physical model based on the displacement in actuator 2 caused by workpiece W2 contacting workpiece W1. Then, controller 40 generates the control instruction that causes actuator 2 to be displaced according to the physical model. As described above, when workpiece W2 comes into contact with workpiece W1 to apply the load to actuator 2, actuator 2 operates like the spring according to the physical model as described above. The excessive load and the point load caused by the contact between workpiece W1 and workpiece W2 can be avoided by the impact absorbing operation.

Thereafter, when the predetermined switching condition is satisfied, the elastic force generating operation is started ((4) the elastic force generating operation). That is, the control instruction that generates the drive force calculated based on the product of spring constant K and displacement ΔX generated in actuator 2 is generated. Pressing force is generated between workpiece W1 and workpiece W2 by the elastic force generating operation, and the pasting of workpiece W1 and workpiece W2 is completed.

Figure 17:
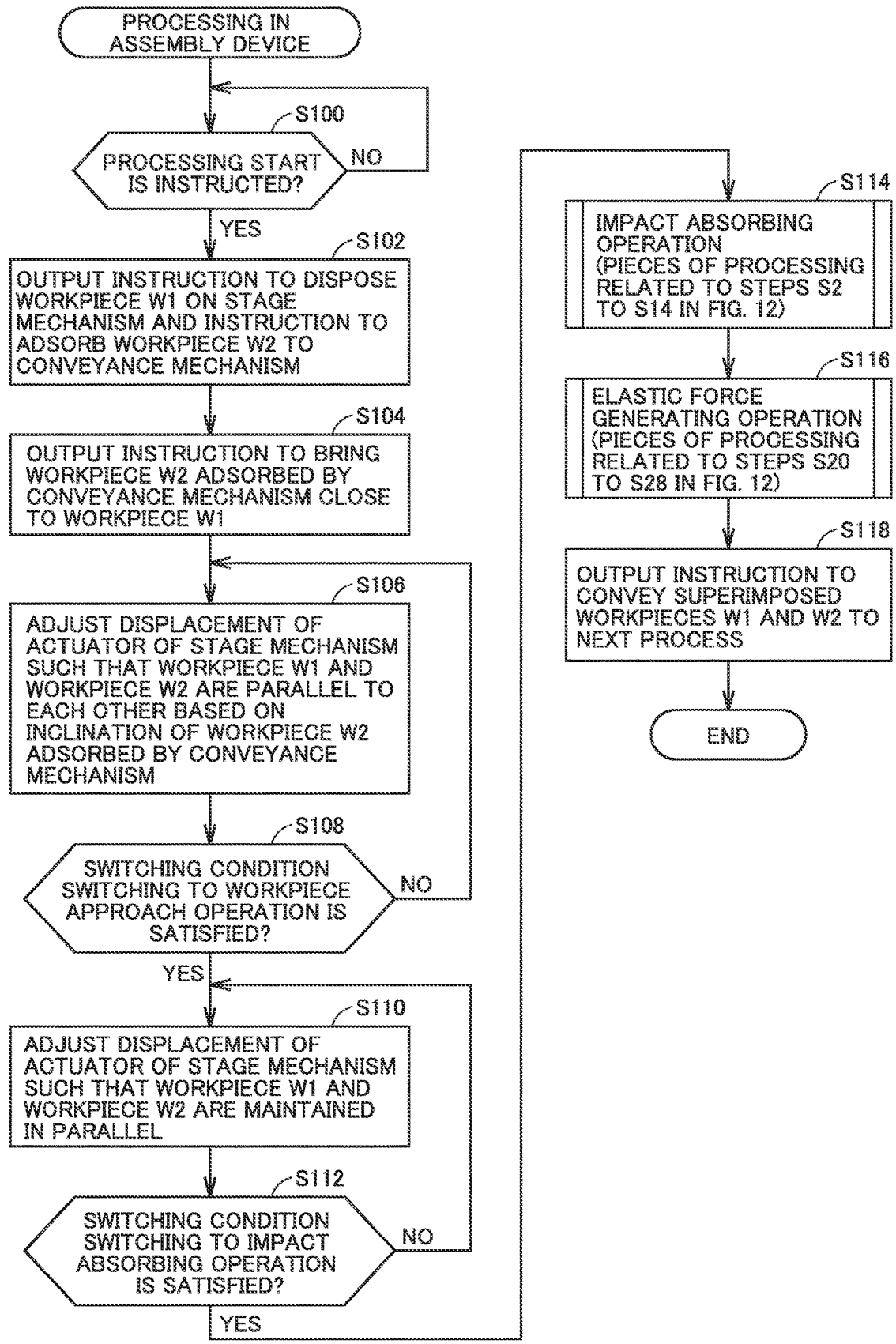
FIG. 17 is a flowchart illustrating a processing procedure in an assembly device in FIGS. 16A and 16B.

FIG. 17 is a flowchart illustrating the processing procedure in assembly device 200 in FIGS. 16A and 16B. Typically, processor 402 of controller 40 executes control program 412 to implement each step in FIG. 17. When processor 402 executes control program 412, a library or the like provided by system program 410 may be used as a part of the processing.

With reference to FIG. 17, when the processing start is instructed (YES in step S100), controller 40 outputs the instruction to dispose workpiece W1 on stage mechanism 110A and the instruction to adsorb workpiece W2 to conveyance mechanism 150 (step S102). Then, controller 40 outputs the instruction to bring workpiece W2 adsorbed by conveyance mechanism 150 close to workpiece W1 (step S104), and starts the parallel maintaining operation.

More specifically, controller 40 adjusts the displacement of actuators 2-1, 2-2, 2-3 of stage mechanism 110A such that workpiece W1 and workpiece W2 are parallel to each other based on inclination of workpiece W2 adsorbed by conveyance mechanism 150 (step S106). In this manner, controller 40 gives the control instruction to stage mechanism 110A such that workpiece W1 and workpiece W2 are parallel to each other according to workpiece W2 superimposed on workpiece W1.

Then, controller 40 determines whether the switching condition switching to the workpiece approach operation is satisfied based on a parallelism degree between workpiece W1 and workpiece W2 (step S108). When the switching condition is not satisfied (NO in step S108), the pieces of processing from step S106 are repeated.

When the switching condition is satisfied (YES in step S108), controller 40 adjusts the displacement of actuators 2-1, 2-2, 2-3 of stage mechanism 110A such that workpiece W1 and workpiece W2 are maintained in parallel (step S110). Then, controller 40 determines whether the switching condition switching to the impact absorbing operation is satisfied based on the distance between workpiece W1 and workpiece W2 (step S112). When the switching condition is not satisfied (NO in step S112), the pieces of processing from step S110 are repeated.

When the switching condition is satisfied (YES in step S112), controller 40 starts the impact absorbing operation (step S114). In the impact absorbing operation, the pieces of processing according to steps S2 to S14 in FIG. 12 are performed.

When the switching condition from the impact absorbing operation to the elastic force generating operation is satisfied, controller 40 starts the elastic force generating operation (step S116). In the elastic force generating operation, the pieces of processing according to steps S20 to S28 in FIG. 12 are performed.

When the superimposition of workpiece W1 and workpiece W2 is completed, controller 40 outputs the instruction to convey superimposed workpieces W1 and W2 to the next process (step S118). Thus, one processing is completed.

As described above, by the series of control including the impact absorbing operation and the elastic force generating operation of the embodiment, the workpieces can be pressed with the surface pressure between the workpieces uniformed while the impact generated between the workpieces to reduce the damage generated on the workpieces. Thus, the generation of a defective product can be reduced and the workpiece of higher quality can be manufactured.

H. Other Embodiments

As described above, the control (impact absorbing operation and/or elastic force generating operation) of actuator 2 of the embodiment can be applied to any application including contact between the objects, such as conveyance, superimposition, bonding, and insertion.

In addition, the impact absorbing operation of actuator 2 of the embodiment can also be applied to a spring mechanism such as vibration removal and vibration suppression, a tensioner, and the like alone.

In addition, the elastic force generating operation of actuator 2 of the embodiment can be applied to a mechanism that generates an arbitrary load such as a press device alone.

I. Advantages

According to the embodiment, the actuator behaves according to the physical formula, so that the simulation for the creation of the control logic and the facility design can be easily performed. In addition, even in the case where the actual device is configured, the deviation from the previous design is reduced.

Impedance control and admittance control exist as an example of a technique of controlling the load and the position.

The impedance control is a technique of adjusting characteristic (softness) of the actuator so as to remain at the target position when the load is applied to the actuator in the state where the target position and the impedance are previously set. For this reason, the control absorbing the impact force as in the impact absorbing operation of the embodiment is not implemented, but rather, sometimes the larger impact force is generated. In addition, in the impedance control, because the target position is given, the generated load cannot be controlled unlike the elastic force generating operation of the embodiment.

In the admittance control, when the load is applied to the actuator while the impedance is previously set, the operation speed (position in each control period) is controlled based on the impedance. Consequently, only the behavior based on the previously-set impedance can be performed, so that the behavior cannot be changed according to the impact force unlike the impact absorbing operation of the embodiment. In addition, because the admittance control determines the behavior when the load is applied to the actuator, the generated load cannot be controlled unlike the elastic force generating operation of the embodiment.

As described above, the impact absorbing operation and the elastic force generating operation of the embodiment are completely different from the impedance control and the admittance control.

J. Appendix

The above embodiment includes the following technical ideas.

[Configuration 1]

A drive system comprising:
  an actuator (2) that is driven by a motor (18) to generate displacement;
  a driver (42) configured to drive the motor; and
  a controller (40) configured to give a control instruction to the driver,
  wherein the controller comprises:
    a model creation unit (420) configured to create a physical model based on displacement caused by application of an external load to the actuator;
    a first instruction generating unit (426) configured to generate a control instruction to the motor such that the actuator generates the displacement according to the physical model;
    a determination unit (430) configured to determine a spring constant;
    a second instruction generating unit (428) configured to generate a control instruction to the motor so as to generate drive force calculated based on a product of the spring constant and the displacement generated in the actuator; and
    a selecting unit (434) configured to select and validate one of the control instructions of the first instruction generating unit and the second instruction generating unit.

[Configuration 2]

The drive system described in configuration 1, wherein the selecting unit validates the control instruction from the second instruction generating unit when a predetermined switching condition is satisfied while the control instruction from the first instruction generating unit is validated.
[Configuration 3]
The drive system described in configuration 2, wherein the switching condition is based on an elapsed time after the external load is applied to the actuator.
[Configuration 4]
The drive system described in configuration 2, wherein the switching condition is based on the displacement generated in the actuator.
[Configuration 5]
The drive system described in any one of configurations 1 to 4, wherein the first instruction generating unit is configured to output a position instruction for designating a target position of the motor as the control instruction, and the second instruction generating unit is configured to output a torque instruction for designating torque to be generated by the motor as the control instruction.
[Configuration 6]
The drive system described in any one of configurations 1 to 5, wherein the model creation unit is configured to create the physical model when a predetermined load is applied to the actuator from an outside.
[Configuration 7]
The drive system according to any one of configurations 1 to 6, wherein the determination unit is configured to set the spring constant for each control period.
[Configuration 8]
A control method for an actuator (2) that is driven by a motor (18) to generate displacement, the control method comprising:
creating (S4, S6, S8) a physical model based on displacement generated by application of an external load to the actuator;
determining (S20) a spring constant;
controlling (S10, S12) the motor such that the actuator generates displacement according to the physical model; and
switching (S22, S24, S26, S28) control of the motor so as to generate drive force calculated based on a product of the spring constant and the displacement generated in the actuator when a predetermined switching condition is satisfied while the motor is controlled such that the actuator generates the displacement according to the physical model.
[Configuration 9]
A control program (412) for controlling an actuator (2) that is driven by a motor (18) to generate displacement, the control program causing a computer (40) to perform:
creating (S4, S6, S8) a physical model based on displacement generated by application of an external load to the actuator;
determining (S20) a spring constant;
controlling (S10, S12) the motor such that the actuator generates displacement according to the physical model; and
switching (S22, S24, S26, S28) control of the motor so as to generate drive force calculated based on a product of the spring constant and the displacement generated in the actuator when a predetermined switching condition is satisfied while the motor is controlled such that the actuator generates the displacement according to the physical model.
It should be considered that the disclosed embodiment is an example in all respects and not restrictive. The scope of the present invention is defined by the claims rather than the above description, and the present invention is intended to include the claims, equivalents of the claims, and all modifications within the scope.

REFERENCE SIGNS LIST

1: drive system, 2: actuator, 4: drive device, 10: main body, 12: rod, 14: distal end portion, 16: coupling member, 18: motor, 20: encoder, 40: controller, 42: driver, 50: natural length state, 52: balanced state, 54: load equilibrium state, 100: workpiece conveyance system, 110, 110A: stage mechanism, 112: base portion, 114, 154: plate, 118: rotating member, 120: robot, 122: end effector, 150: conveyance mechanism, 152: support column, 200: assembly device, 402: processor, 404: main memory, 406: input and output unit, 408: storage, 410: system program, 412: control program, 420: 10 physical model, 422: characteristic estimating unit, 424: angular frequency setting unit, 426: position instruction generating unit, 428: load instruction generating unit, 430: spring constant changing unit, 432: displacement calculating unit, 434: selecting unit, 436: switching condition, W, W1, W2: workpiece

The invention claimed is:
1. A drive system comprising:
an actuator that is driven by a motor to generate displacement, the actuator being arranged to support a plate on which a workpiece is to be disposed;
a driver configured to drive the motor; and
a controller configured to give a control instruction to the driver,
wherein the controller is configured to:
create a physical model based on displacement caused by application of an external load to the actuator, the application of the external load including an action of disposing the workpiece on the plate;
generate a first control instruction to the motor such that the actuator generates displacement according to the physical model;
determine a spring constant;
generate a second control instruction to the motor so as to generate drive force calculated based on a product of the spring constant and the displacement generated in the actuator; and
select and validate one of the control instructions of the first control instruction and the second control instruction.
2. The drive system according to claim 1, wherein the controller is configured to validate the second control instruction when a predetermined switching condition is satisfied while the first control instruction is validated.
3. The drive system according to claim 2, wherein the switching condition is based on an elapsed time after the external load is applied to the actuator.
4. The drive system according to claim 2, wherein the switching condition is based on the displacement generated in the actuator.
5. The drive system according to claim 1, wherein
the first control instruction comprises a position instruction for designating a target position of the motor, and
the second control instruction comprises a torque instruction for designating torque to be generated by the motor.
6. The drive system according to claim 1, wherein the controller is configured to create the physical model when a predetermined load is applied to the actuator from an outside.

7. The drive system according to claim 1, wherein the controller is configured to set the spring constant for each control period.

8. A control method for an actuator that is driven by a motor to generate displacement, the actuator being arranged to support a plate on which a workpiece is to be disposed, the control method comprising:
- creating a physical model based on displacement generated by application of an external load to the actuator, the application of the external load including an action of disposing the workpiece on the plate;
- determining a spring constant;
- controlling the motor such that the actuator generates displacement according to the physical model; and
- switching control of the motor so as to generate drive force calculated based on a product of the spring constant and the displacement generated in the actuator when a predetermined switching condition is satisfied while the motor is controlled such that the actuator generates the displacement according to the physical model.

9. A non-transitory storage medium encoded with a computer-readable control program for controlling an actuator that is driven by a motor to generate displacement, the actuator being arranged to support a plate on which a workpiece is to be disposed, the control program causing one or more processors to perform:
- creating a physical model based on displacement generated by application of an external load to the actuator, the application of the external load including an action of disposing the workpiece on the plate;
- determining a spring constant;
- controlling the motor such that the actuator generates displacement according to the physical model; and
- switching control of the motor so as to generate drive force calculated based on a product of the spring constant and the displacement generated in the actuator when a predetermined switching condition is satisfied while the motor is controlled such that the actuator generates the displacement according to the physical model.

10. The control method according to claim 8, wherein the switching condition is based on an elapsed time after the external load is applied to the actuator.

11. The control method according to claim 8, wherein the switching condition is based on the displacement generated in the actuator.

12. The control method according to claim 8, wherein
- the controlling comprises outputting a position instruction for designating a target position of the motor, as a control instruction, and
- the switching comprises outputting a torque instruction for designating torque to be generated by the motor, as a control instruction.

13. The control method according to claim 8, wherein the creating comprising creating the physical model when a predetermined load is applied to the actuator from an outside.

14. The control method according to claim 8, further comprising:
setting the spring constant for each control period.

15. The non-transitory storage medium according to claim 9,
wherein the switching condition is based on an elapsed time after the external load is applied to the actuator.

16. The non-transitory storage medium according to claim 9, wherein the switching condition is based on the displacement generated in the actuator.

17. The non-transitory storage medium according to claim 9, wherein
the controlling comprises outputting a position instruction for designating a target position of the motor, as a control instruction, and
the switching comprises outputting a torque instruction for designating torque to be generated by the motor, as a control instruction.

18. The non-transitory storage medium according to claim 9, wherein the creating comprising creating the physical model when a predetermined load is applied to the actuator from an outside.

19. The non-transitory storage medium according to claim 9, further comprising:
setting the spring constant for each control period.

* * * * *